Figure 1:
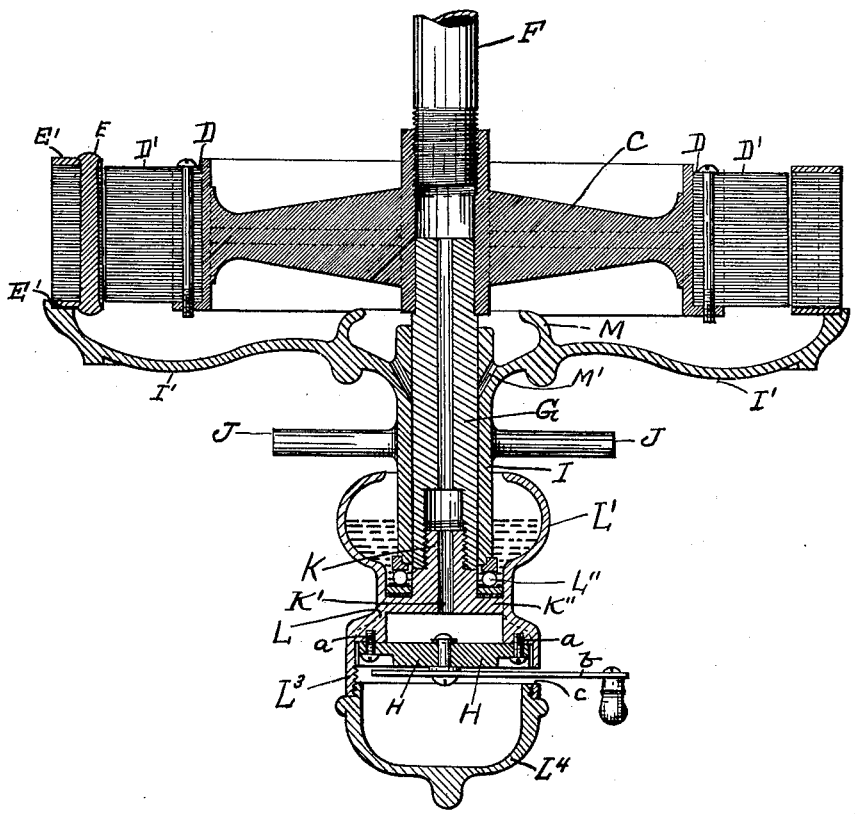

No. 653,906. Patented July 17, 1900.
E. W. BROWN.
ALTERNATING CURRENT MOTOR.
(Application filed Jan. 29, 1900.)
(No Model.) 3 Sheets—Sheet 1.

WITNESSES:
Carl Knox.
C. Theobald.

E. W. Brown,
INVENTOR.
By R. J. McCarty.
ATTORNEY.

No. 653,906. Patented July 17, 1900.
E. W. BROWN.
ALTERNATING CURRENT MOTOR.
(Application filed Jan. 29, 1900.)

(No Model.) 3 Sheets—Sheet 2.

WITNESSES:
Carl Stroe
C. Theobald

E. W. Brown,
INVENTOR.
By R. J. McCarty
his ATTORNEY.

THE NORRIS PETERS CO., PHOTO-LITHO., WASHINGTON, D. C.

No. 653,906. Patented July 17, 1900.
E. W. BROWN.
ALTERNATING CURRENT MOTOR.
(Application filed Jan. 29, 1900.)
(No Model.) 3 Sheets—Sheet 3.

WITNESSES:
Carl Stowe.
C. Theobald

E. W. Brown
INVENTOR,
By R. J. McCarty.
ATTORNEY.

UNITED STATES PATENT OFFICE.

EDGAR W. BROWN, OF DAYTON, OHIO.

ALTERNATING-CURRENT MOTOR.

SPECIFICATION forming part of Letters Patent No. 653,906, dated July 17, 1900.

Application filed January 29, 1900. Serial No. 3,176. (No model.)

*To all whom it may concern:*

Be it known that I, EDGAR W. BROWN, a citizen of the United States, residing at Dayton, in the county of Montgomery and State of Ohio, have invented certain new and useful Improvements in Alternating-Current Motors; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in alternating-current electric motors.

The object of the invention is to improve the alternating-current induction-motors, such as are operated on a single-phase circuit, with a view to producing a slow-speed motor such as would be adapted for use in connection with a direct-connected ceiling-fan—that is, a ceiling-fan in which the blades are connected directly to the rotating part of the motor.

To start the motor, two energizing-circuits are required, one of which is composed of comparatively-large wire of a higher amount of self-induction and lower amount of resistance than the other circuit, which is composed of comparatively-fine wire, so that after the motor attains a certain speed the current is cut off from the fine wire and the motor continues to run satisfactorily. To attain a slow speed, a comparatively-large number of poles are employed, for in this type of motor the speed decreases inversely as the number of poles are increased.

The improvements consist, first, in the arrangement of the energizing-circuits and the switch and the manner of connecting the circuits thereto; secondly, the construction and arrangement of the polar extensions of the field-magnet, whereby said polar extensions are given uniformly-inclined positions viewed in a plane parallel with the planes of the laminations, and, thirdly, of other mechanical features of the motor which will be hereinafter fully described in connection with the accompanying drawings, of which—

Figure 2:
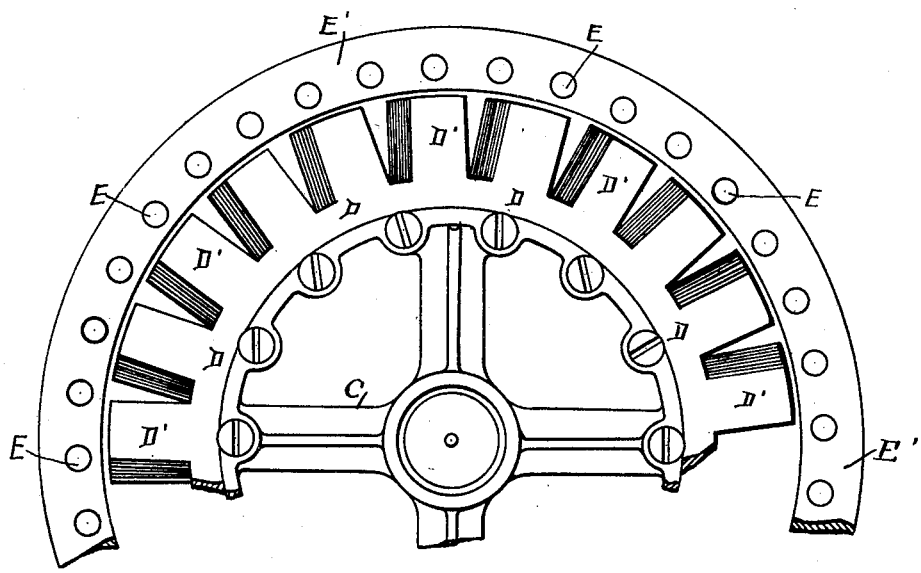
Figure 3:
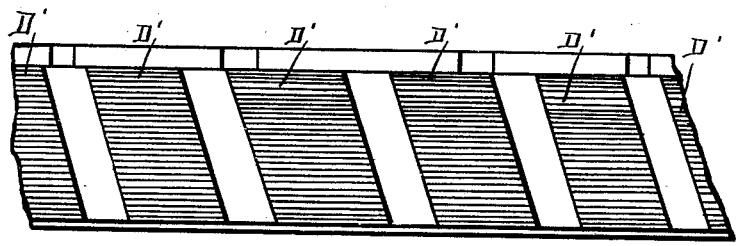
Figure 4:
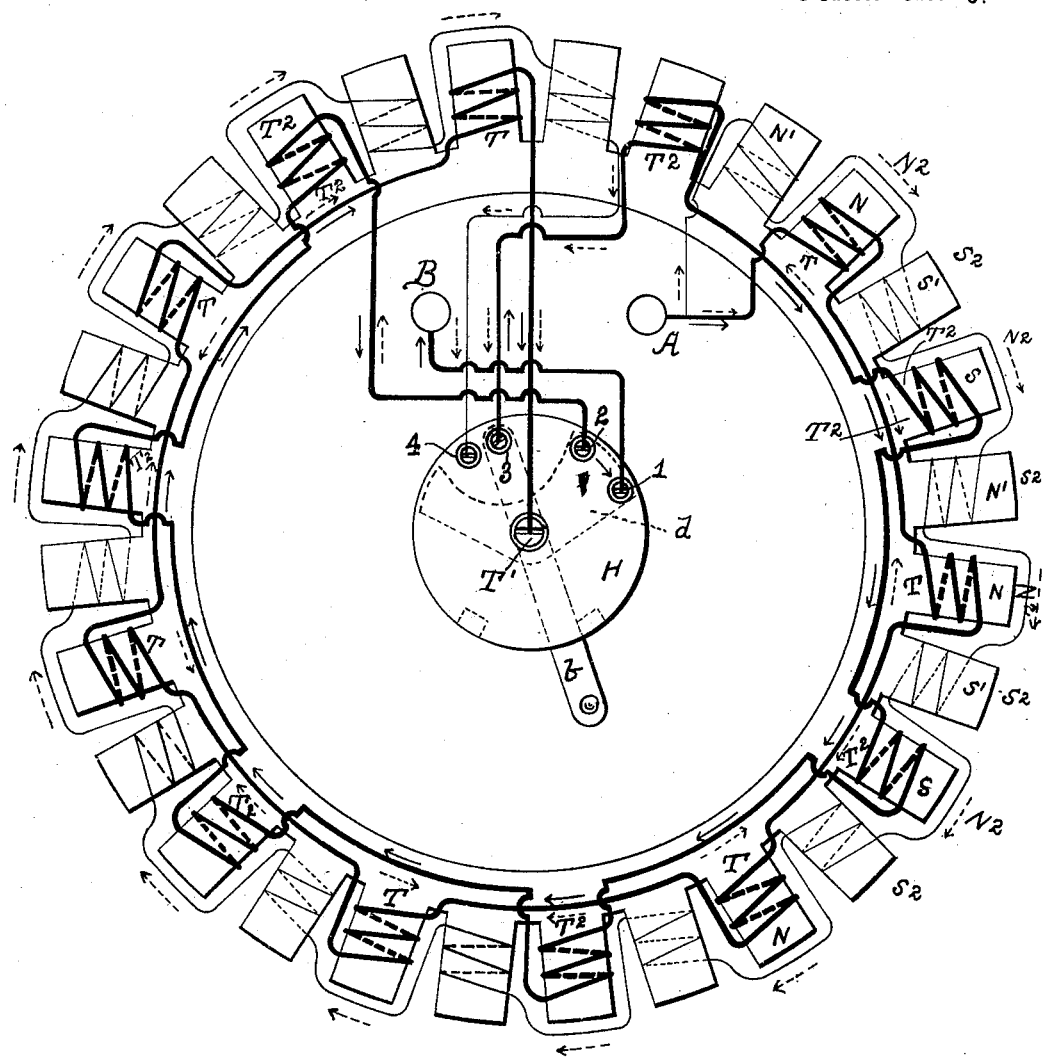
Figure 5:
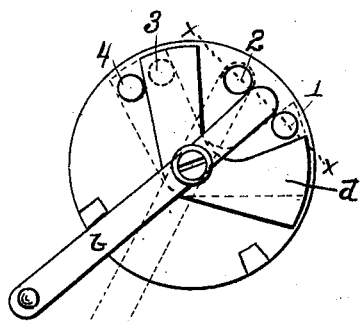
Figure 6:
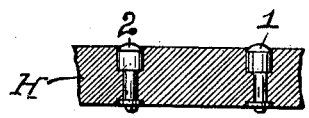

Figure 1 is a central vertical section of the motor. Fig. 2 is a partial top plan view of the field-magnet core and the rotating armature. Fig. 3 is an elevation of the polar extensions of the field-magnet core viewed on a plane parallel with the laminations. Fig. 4 is a diagram of the windings of the field-magnet and the switch and connections. Fig. 5 is another view of the switch alone. Fig. 6 is a sectional view of the switch, full size, on the line $x\ x$ of Fig. 5.

In a detailed description of my invention similar reference characters will designate corresponding parts in the several views.

C designates the field-magnet spider, upon which the laminations D, comprising the field-magnet core, are assembled and to which the said laminations are secured in any suitable manner. These laminations D have the usual polar extensions D'; but in building up the same the laminations are so placed upon each other as to give to each pole-piece a uniformly-inclined position in parallel relation with the adjacent pole-pieces, as shown in Figs. 2 and 3. The short-circuited or induced-current bars E of the armature are arranged equal distances apart in vertical positions. These bars are short-circuited by copper rings E'. In the rotation of the armature the said bars enter and leave the magnetic flux of the poles of the field gradually, owing to the slanting or inclined positions of the polar projections. If the field were assembled with the poles in vertical positions, the bars of the armature would enter and leave the magnetic flux in an abrupt manner and the rotating tendency of the armature would not be sufficient to pull the bars through the magnetic influence of the poles. This tendency of the motor to stop, it will be understood, is only prevalent when an attempt is made to start it. Therefore the tendency of the motor to stop or remain stationary is entirely overcome by this arrangement of the polar extensions. The depending or supporting pipe F screws into the axis of the spider, and the shaft G is secured to the lower part of said spider. This shaft G is hollow and through it are passed the wires which make the connections between the circuits and the switch H. The body of the shaft G is inclosed by the tubular portion I of the revolving shell I', which supports the armature, and from said part I the fan-blade supports J extend. The opening in the lower end of shaft G is enlarged and is screw-threaded to receive the internal projection K, which has an opening K' through it. This screw-threaded projection K is an integral part of a shell L, the upper portion L' of which forms an oil-cup for the ball-bearings L'', and the lower portion L³ forms a housing for the switch, the cap L⁴ inclosing the extreme lower end of said shell. The internal part K is enlarged at its lower end K'' and forms a dividing-wall between the oil-cup and the switch-housing. The lower end of the tubular portion I of the shell is immersed in the oil, and the oil travels upwardly between the said part I and the shaft G through a spiral oil-groove, which is cut in the inner surface of the said tubular extension I, but which does not appear in the drawings. The oil thus passing upwardly around shaft G is confined by the annular flange M, which projects upward from the upper side of the shell. Any oil finding its way into the space inclosed by the flange M will find its way down the shaft G through drain-holes M'. The switch H is of porcelain or other insulating material and is secured by screws $a$ $a$, the lever $b$ passing out of the shell L through a horizontal slot $c$ in said shell.

Referring to Figs. 4, 5, and 6, 1, 2, 3, and 4 are the contact-points, which are inserted in switch-plate H and are secured by a small screw and washer, as shown in Fig. 6. The upper ends of said contact-points are extended slightly above the switch-plate H and are rounded, so that the switch-lever $b$ will pass easily on and off of said contact-points. $d$ is a metal contact-plate which is secured to but insulated from the lever $b$. It will be seen that the fine wire or starting coils are wound on every other pole. The direction of the winding of one coil is the reverse of the coils to which it is connected throughout the circuit. The main circuit is divided into two sections. One section, starting at A, passes around polar projections T and terminates at and makes connection with the fulcrum T' of the switch-lever and makes connection with the switch-lever. The other section of said circuit starts at contact-point 2, passes around the polar projections T², and terminates at contact-point 3 of the switch. The number of turns of fine wire in the starting-circuit is equal to the number of turns in the main circuit.

In Fig. 5 when the switch-lever $b$ is in the position shown by the solid lines the current is shut off. When in position shown by the dotted lines, the current passes through all the wire in the two circuits, and if a direct current be applied to the binding-posts A and B, Fig. 4, the positive terminal being A and the negative B, the current will pass through the two circuits in the direction indicated by the dotted arrows, giving the polarities as indicated by the letters N and S for the main circuit and N' and S' for the starting-circuit.

It will be seen that the two circuits produce a fourteen-pole motor when the switch is in this position. When the switch-lever $b$, Fig. 4, is moved to point 3 and the plate $d$ is also moved so as to make contact with points 1 and 2 and break contact with point 4, then the current is cut off from the starting-coils and passes through the main coils only and in a direction as indicated by the solid arrows, which gives a polarity as indicated by the letters N² and S². The main coils being connected in two sections, the current will reverse in one section—to wit, the section which terminates at contact-points 2 and 3—thus making the current go through all the main coils in the same direction, giving the polarity shown by letters N² and S². The poles which are surrounded by the fine coils, but are no longer under the influence of them, are now magnetized by the main coils, and the polarity will be the opposite of that of the poles upon which the main coils are wound. It will therefore be seen that the number of poles have been doubled, or a motor of twenty-eight poles is obtained. The speed consequently is reduced one-half. The obtainment of this result is one of the important features of my invention.

Having fully described my invention, I desire to claim—

1. In an alternating-current motor, the combination with a field-core having polar projections, of main coils connected in two separate sections and placed on every alternate polar projection, and starting-coils on every polar projection between each two of the polar projections having the main coils, the starting-coils being wound so that the current will pass through every alternate coil in the opposite direction, substantially as described.

2. In an alternating-current motor, the combination with an armature, of a field-core provided with polar projections, main coils connected in two separate sections and placed on every alternate polar projection, and starting-coils on every polar projection between each two of the polar projections having the main coils, substantially as described.

3. In an alternating-current motor, the combination with a field-core having polar projections, of main coils connected in two separate sections and placed on every alternate polar projection so that the current will pass through said sections in series, starting-coils on every polar projection between each two of the polar projections having the main coils, a switch, contact-points by means of which said switch is adapted to complete the circuits which start the motor at which time current passes through the starting-coils, also through one section of the main coils in one direction, and the other section of the main coils in an opposite direction.

4. In an alternating-current motor, the combination with a field-core having polar projections, of main coils connected in two separate sections and placed on every alternate polar projection, so that the current will pass through said sections in series, starting-coils on every polar projection between each two of the polar projections having the main coils, a switch, contact-points by means of which said switch is adapted to complete the circuits, and to subsequently break the starting-circuit and reverse the current in one section of the other circuit, thus doubling the number of magnetic poles.

5. In an alternating-current motor, the combination with a laminated field-core having polar projections, of main coils in two sections and placed upon every alternate polar projection, starting-coils placed upon every polar projection not occupied by the main coils, the winding of the starting-coil on one polar projection being reversed from that of the next polar projection occupied by the starting-coil, one terminal of one section of the main coils and one terminal of the circuit formed by the starting-coils being connected to binding-post A, the other terminal of said section of the main coils being connected to the switch-lever $b$, the other terminal of the starting-coils being connected to binding-post B through the switch, and the other section of said main coils terminating at contact-points 2 and 3 and making connection with binding-post B through contact-plate $d$, substantially as shown and described.

6. In an alternating-current motor, the combination with an armature provided with short-circuited conductors, of a field-magnet core provided with polar projections, main coils wound on every alternate polar projection of said field-magnet core, said main coils connected in two separate sections and starting-coils, substantially as shown and described.

In testimony whereof I affix my signature in presence of two witnesses.

EDGAR W. BROWN.

Witnesses:
R. J. McCARTY,
CARL H. NOE.